J. F. EAST.
BARREL MAKING MACHINE.
APPLICATION FILED APR. 15, 1909.
998,478.
Patented July 18, 1911.
6 SHEETS—SHEET 1.
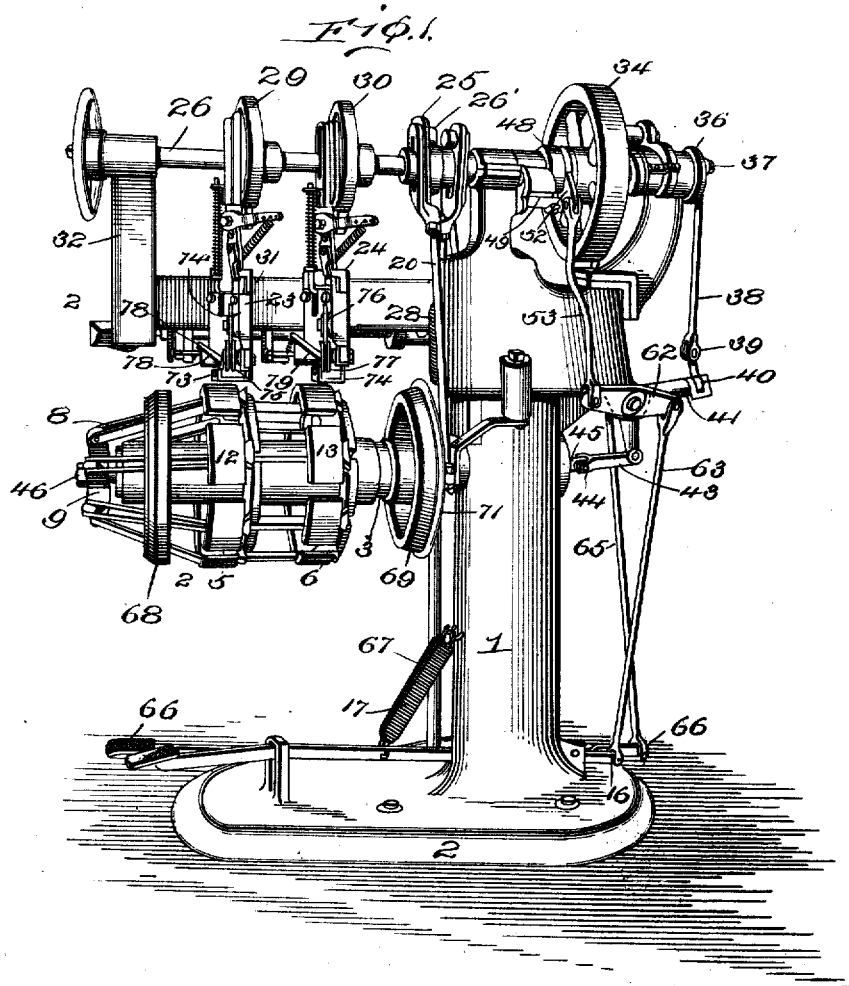
Witnesses
J. M. Fowler Jr.
A. L. Kitchin
Inventor
John F. East
By Mason Fenwick Lawrence
his Attorneys

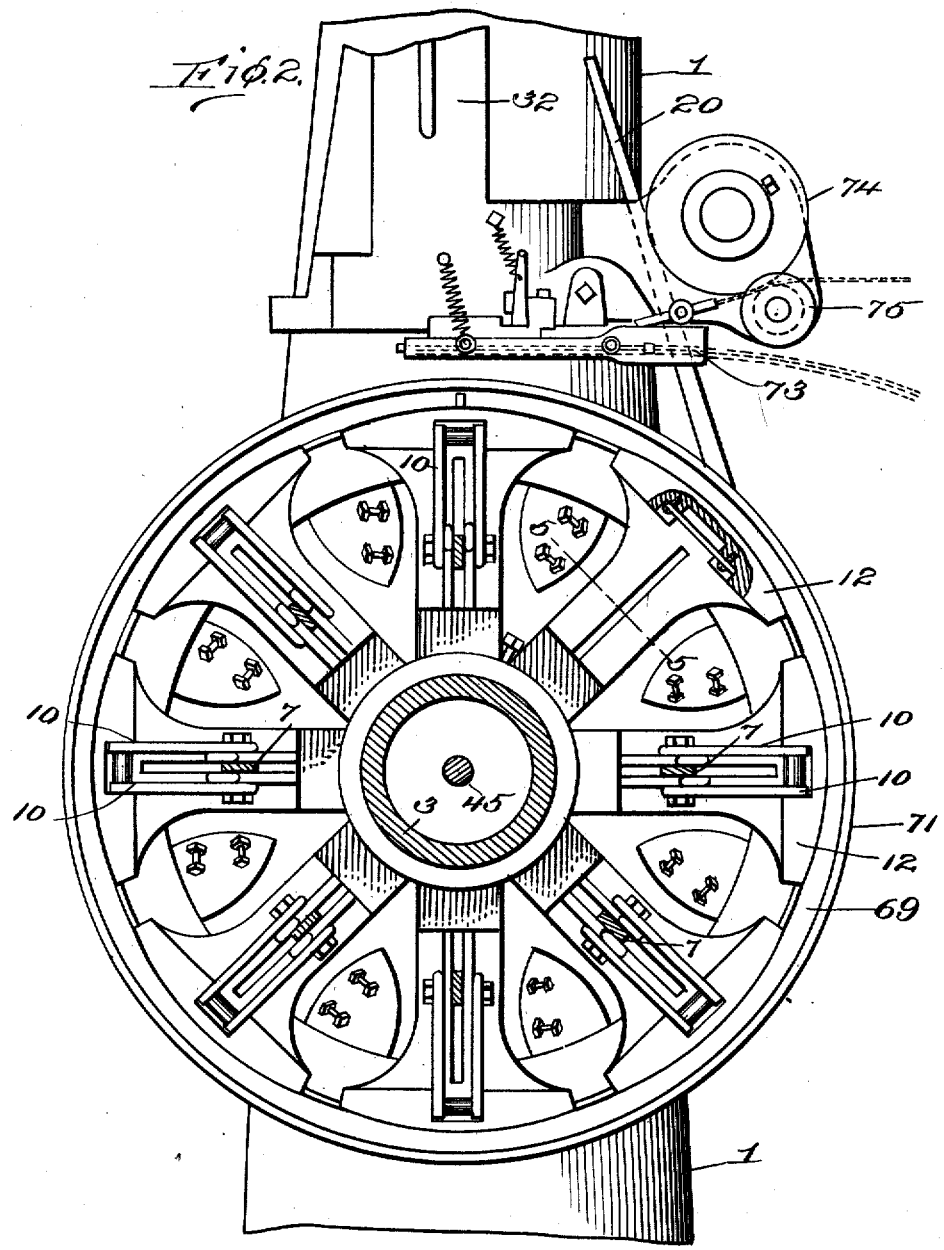

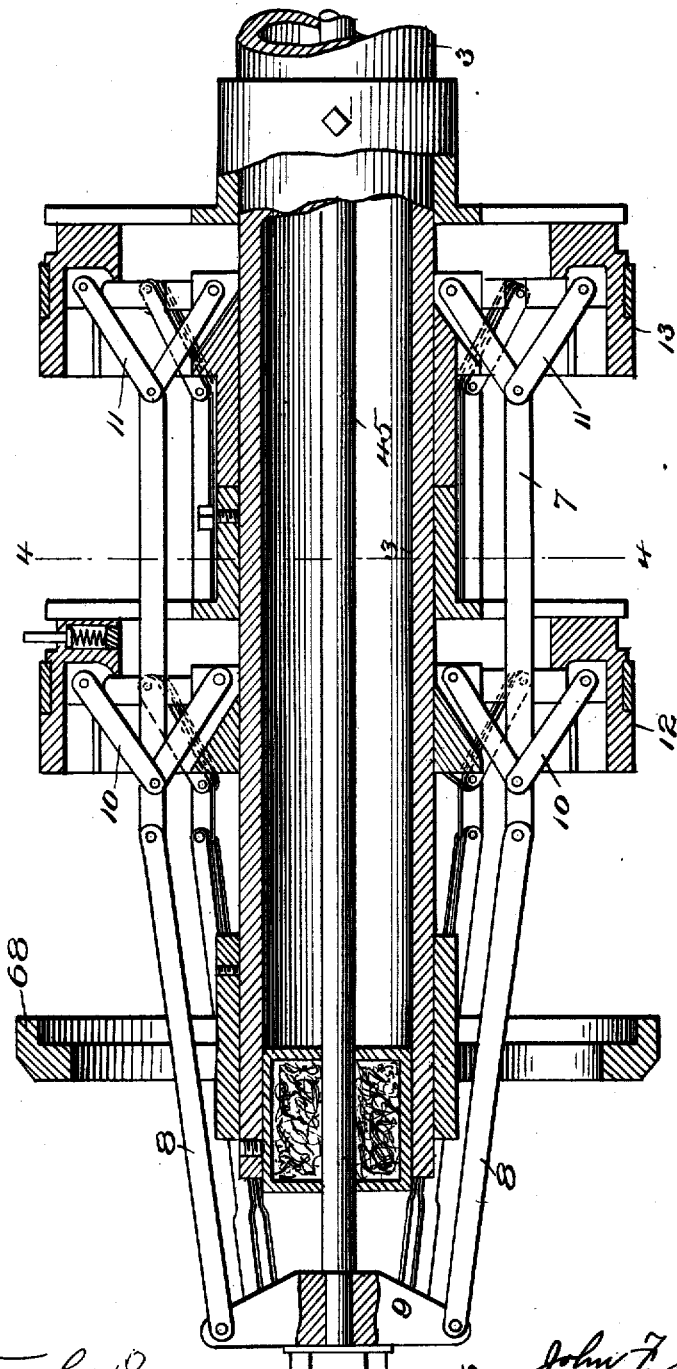

J. F. EAST.
BARREL MAKING MACHINE.
APPLICATION FILED APR. 15, 1909.
998,478.
Patented July 18, 1911.
6 SHEETS—SHEET 4.
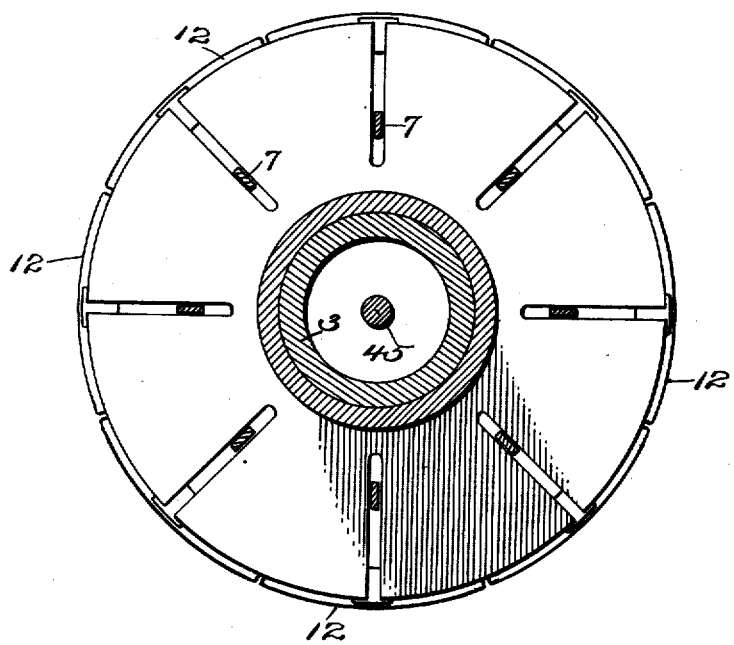
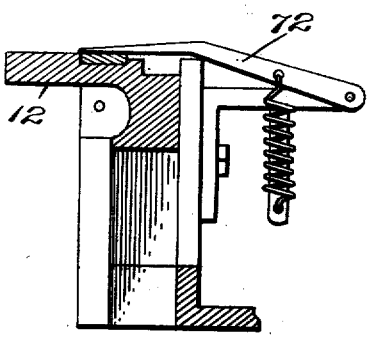
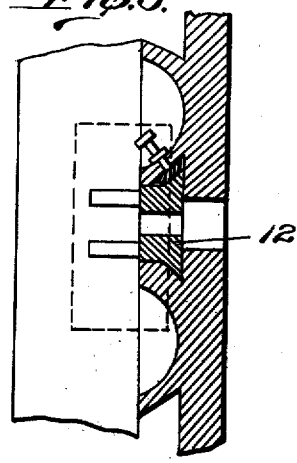
Witnesses
J. M. Fowler Jr.
W. L. Kitchin
Inventor
John F. East
By Mason Fenwick Lawrence
His Attorneys J. F. EAST.
BARREL MAKING MACHINE.
APPLICATION FILED APR. 15, 1909.
998,478.
Patented July 18, 1911.
6 SHEETS—SHEET 5.
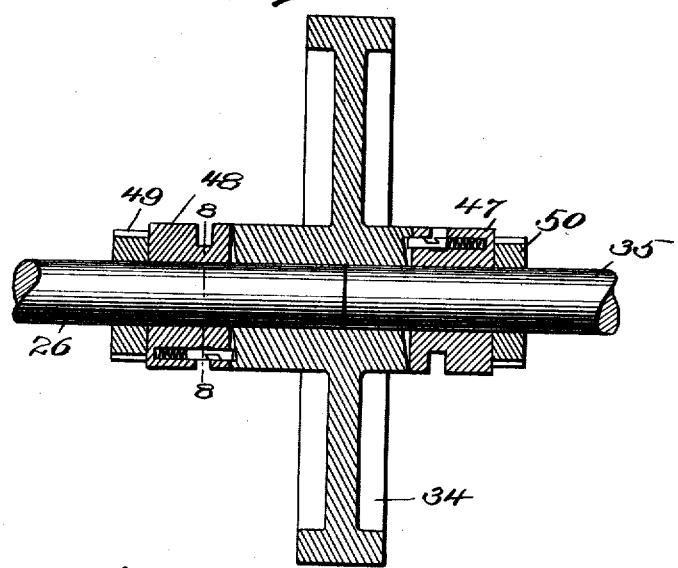
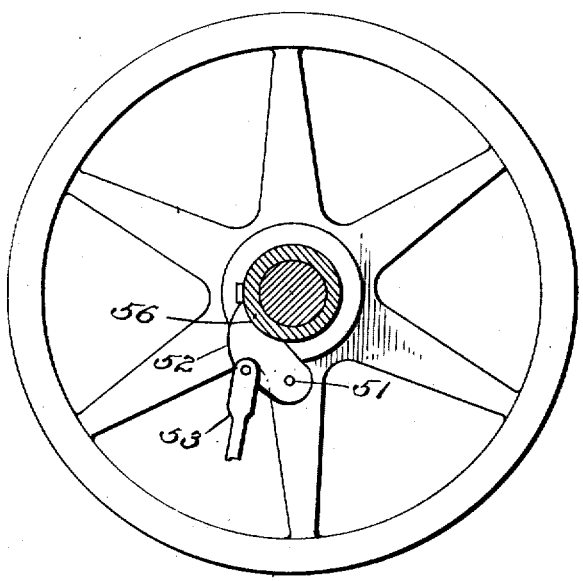
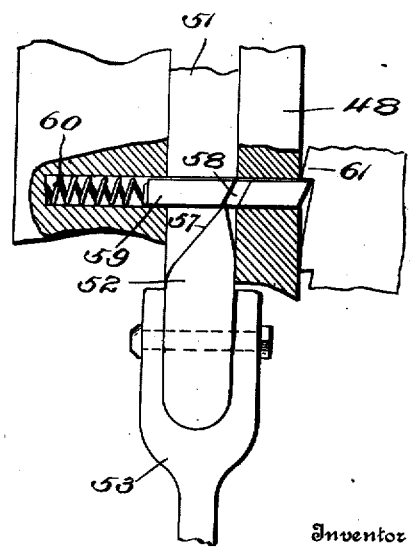

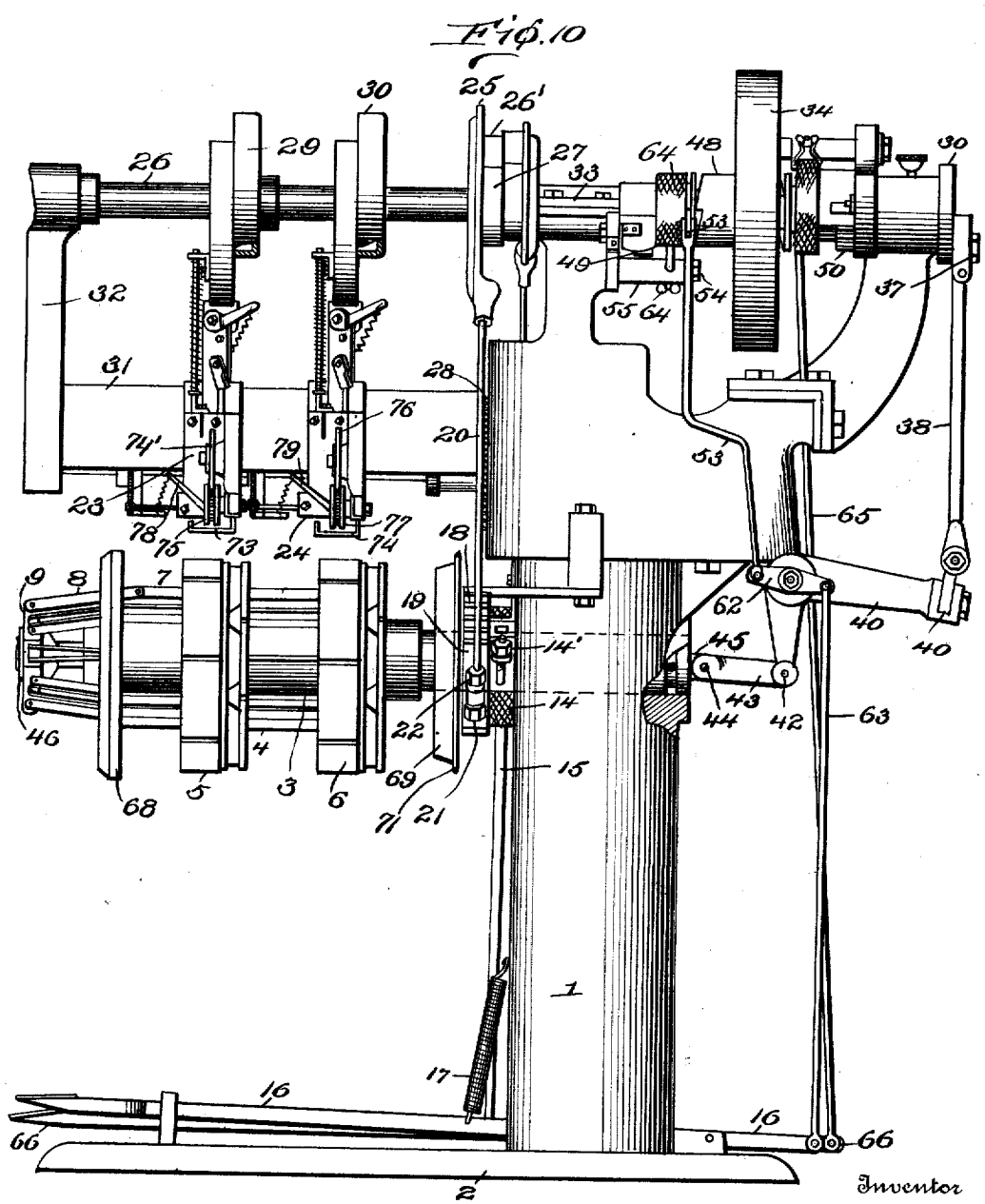

UNITED STATES PATENT OFFICE.

JOHN F. EAST, OF NORFOLK, VIRGINIA, ASSIGNOR TO FARMERS MANUFACTURING COMPANY, OF NORFOLK, VIRGINIA, A CORPORATION OF VIRGINIA.

BARREL-MAKING MACHINE.

998,478.     Specification of Letters Patent.     Patented July 18, 1911.

Application filed April 15, 1909. Serial No. 490,060.

*To all whom it may concern:*

Be it known that I, JOHN F. EAST, a citizen of the United States, residing at Norfolk, in the county of Norfolk and State of Virginia, have invented certain new and useful Improvements in Barrel-Making Machines; and I do hereby declare the following to be a full, clear, and exact description of the invention, such as will enable others skilled in the art to which it appertains to make and use the same.

This invention relates to improvements in barrel making machines, and particularly to machines for expanding the barrel, and has for an object the provision of improved means for expanding a barrel and securing thereto hoops for holding the barrel in an expanded condition.

Another object of the invention is the provision of a rotating expansible mandrel having associated therewith means for securing hoops to a barrel placed thereon after the mandrel has been expanded.

A still further object of the invention is the construction of a barrel making machine arranged with a supporting mandrel having expansible forms or anvils connected therewith, the anvils in turn being connected with mechanism for expanding the same, the anvils having also associated therewith mechanism for securing hoops to a barrel placed thereon.

Another object in view is the provision of mechanism for forming veneer barrels from veneer tubes by expanding the tubes centrally and securing inside and outside hoops between ends of the tube for holding the tube expanded and for bracing the same whereby the tube is held in the shape of an ordinary barrel and constitutes a barrel with the exception of the ends.

With these and other objects in view the invention comprises certain novel constructions, combinations and arrangement of parts as will be hereinafter more fully described and claimed.

In the accompanying drawings: Figure 1 is a perspective view of an embodiment of the invention. Fig. 2 is an enlarged sectional view through the structure shown in Fig. 1, approximately on line 2—2 thereof. Fig. 3 is an enlarged vertical horizontal section through the expanding former. Fig. 4 is a section through Fig. 3 approximately on line 4—4 thereof. Fig. 5 is an enlarged detail fragmentary sectional view approximately on line 5—5 of Fig. 2. Fig. 6 is an enlarged fragmentary sectional view through one of the anvils showing in connection therewith a hoop retaining clamp. Fig. 7 is a section through the power wheel and clutches for connecting the wheel with the operating shafts. Fig. 8 is a section through Fig. 7 approximately on line 8—8, the power wheel being turned slightly for showing the clutch operating mechanism beginning to engage its catch. Fig. 9 is an enlarged detail fragmentary top plan view of ⁓ of the clutches and operating levers the for the same being broken away to disclose the operation of the catch. Fig. 10 is a ont elevation on a slightly enlarged scale of the machine shown in Fig. 1.

In the construction of barrels with a machine embodying the present invention a strip of veneer of the proper size to make a barrel is taken and preferably is provided with a plurality of slits, which falls short of the ends of the strip of veneer and then the veneer strip is bent in to a tube after which hoops are secured preferably on the inside and outside of the ends. As will be evident this will form simply a cylindrical tube of veneer. The tube of veneer is then taken and placed upon a machine embodying the invention which is arranged to have the expanding anvils located between the ends of the tube. After the tube has been placed upon the machine the anvils thereof are expanded which will cause the central part of the tube to expand but not the ends as the ends are held in place by suitable hoops. After the barrel has been expanded the anvils are rotated for a complete rotation and the stapling mechanism operated at the same time whereby one or more hoops are secured to the outer surface and the interior of the barrel between the ends for holding the barrel in an expanded condition and for bracing the same, the number of hoops being regulated by the number of anvils used. After the hoop or hoops have been secured to the central part of the barrel the same is removed from the anvil and is held in a bulged condition by the hoops and presents the proper shape for a barrel the ends however being not yet supplied. In constructing a machine for forming a barrel in this manner the same is preferably formed as shown in the accompanying drawings though slight changes and modifications may be made without departing from the spirit of the invention.

In the accompanying drawings forming part of this specification 1 indicates a standard preferably formed integral with a base 2 which is arranged to be bolted or firmly secured in position. Mounted upon standard 1 is a tubular shaft 3 that carries the former 4 comprising anvils 5 and 6 and a plurality of rods 7 and levers 8. The levers 8 are connected to a reciprocating bearing 9 so that upon inward movement of bearing 9 levers 8 will act upon the rods 7 which are connected to toggles 10 and 11 for actuating the independent segments 12 and 13 of anvils 5 and 6 for expanding the same. The anvils 5 and 6 are rigidly secured to shaft 3 and are rotated therewith. The shaft 3 is rotatably mounted in standard 1 but is not movable longitudinally. A friction brake 14 is provided for stopping the anvils 5 and 6 immediately upon the releasing of the actuating power. A lever 15 is connected with the friction brake 14 for releasing the same upon the downward movement of treadle 16, which downward movement is arranged to operate the clutch and various other mechanism hereinafter more fully described for connecting the power with shaft 3. This will permit a free rotation of shaft 3 and the anvils 5 and 6, but immediately upon the releasing of lever 16 power will be cut off and also friction brake 14 will be permitted to act upon shaft 3 for almost instantly stopping the same, a spring 17 being provided for returning link or rod 15.

Connected to shaft 3 is a ratchet gear 18 which is engaged by a pawl 19. Pawl 19 is carried by a reciprocating rod 20 and is held adjustably in position by nuts 21 and 22. Upon movement of rod 20 in one direction pawl 19 will move over the teeth of ratchet wheel 18 without moving the wheel, but upon movement of rod 20 in the opposite direction ratchet wheel 18 will be moved forward one step and consequently shaft 3 and anvils 5 and 6 will be rotated for one step. Preferably the rod 20 is arranged to reciprocate a sufficient distance to rotate the anvils 5 and 6 so as to permit the stapling mechanisms 23 and 24 to insert a staple near each end of each segment 12 and 13 of anvils 5 and 6. However, it will be evident that the anvils 5 and 6 may be rotated a greater or less distance as may be desired for spacing the staples a greater or less distance apart. Rod 20 is secured to yoke 25 which fits over shaft 26. Yoke 25 carries an anti-friction wheel 26' which engages cam 27 which in turn is rigidly secured to shaft 26 so that upon the rotation of shaft 26 cam 27 will be rotated and will move in one direction wheel 26' and consequently yoke 25 and rod 20 for causing pawl 19 to rotate the form. A spring 28 is connected with rod 20 and with standard 1 for moving rod 20 in the opposite direction for causing pawl 19 to engage another tooth of ratchet wheel 18, preparatory to moving the form another step. By this means whenever shaft 26 is rotated anvils or expanding formers 5 and 6 are rotated step by step. As the anvils or formers 5 and 6 are rotated step by step mechanisms 23 and 24 are operated by cams 29 and 30 for forcing a staple into position during the time the formers or anvils are stationary which is the time necessary for spring 28 to retract and pawl 19 to retract, and also the time necessary for cam 27 to finish its revolution preparatory to again raising wheel 26'. The stapling mechanism 23 and 24 may be of any desired kind, but arranged to operate in conjunction with the anvils or formers 5 and 6 as above set forth, and are supported in any desired manner as for instance a supporting bar 31 which is secured to standard 1. Bar 31 also supports upright 32 which upright receives the power end of shaft 26 and presents a journal bearing therefor. Shaft 26 passes through a bearing 33 arranged at the upper end of standard 1 and is supported thereby. The shaft also passes through bearing 33 to a position about centrally of the power wheel 34 (Fig. 7). From a position substantially central of power wheel 34 extends a shaft 35 that is arranged in axial alinement with shaft 26 and carries at its outer end a crank wheel 36 from which extends a wrist pin 37 for engaging a link 38. Link 38 is pivotally mounted at 39 to a clevis 40 which in turn is mounted in a bell crank lever 41. The bell crank lever 41 is connected at 42 to a link 43 which also in turn is pivotally connected at 44 to an operating shaft 45 that passes through hollow shaft 3 and receives a nut or any desired kind of securing member 46 at the end thereof for causing movement to be conveyed from shaft 45 to the links 8. By this arrangement of shafting 26 and 35 the same are operated independently so that whenever shaft 26 is rotated shaft 3 may be rotated and stapling mechanisms 23 and 24 operated, and whenever shaft 35 is rotated a longitudinal movement may be conveyed to shaft 45 for expanding or contracting the anvils or forms 5 and 6.

The shafts 26 and 35 are connected to power wheel 34 by means of a pair of clutches 47 and 48, through speed reducing gearing 49 and 50. One of the gears of gearing 49 and 50 is secured to the respective clutches 47 and 48 and also one of the gears of gearing 49 and 50 is connected with the respective shafts 26 and 35 so that whenever either of the clutches is thrown into engagement with power wheel 34 movement will be conveyed to the respective shafts. Clutch 48 (Figs. 7 and 9) is formed with a groove 51 for accommodating an operating lever 52 which has pivotally connected therewith an operating rod 53. The lever 52 is pivotally connected at 54 to a supporting bracket 55 that is rigidly secured to or formed integral with standard 1. The lever 52 is formed arc shaped at 56 so as to normally engage the surface of groove 51. In addition the lever 52 is beveled at 57 for forming a point which is adapted to engage the side walls of the slot or groove 58 in a catch 59. Catch 59 is continuously acted upon by spring 60 for giving the same tendency to engage one of the notches or teeth 61 on the part of the clutch that is rigidly secured to or formed integral with wheel 34.
Clutch 48 proper is provided with a smooth surface on the end and depends upon the catch 59 to engage the teeth 61 on the hub of wheel 34 for connecting wheel 34 with a clutch. The lever 52 is adapted to engage the wall of slot or groove 58 and retract the catch 59 against the action of spring 60 when it is desired to have wheel 34 rotate without rotating shaft 26. Operating arm 53 that is pivotally connected with lever 52 is also pivotally connected to a pivotally mounted lever 62 which in turn is connected by link 63 to treadle 16. Treadle 16 is normally held raised by spring 17, and consequently the arc shaped edge 56 of lever 52 is held in engagement with the bottom of groove 51 and the bevel 57 in engagement with the walls of groove or slots 58 for holding the catch retracted. When it is desired to connect wheel 34 with shaft 26 for rotating the formers or anvils 5 and 6 and operating the stapling mechanisms 23 and 24, lever 16 is depressed. This depression of lever 16 will raise link 63 and lower or pull upon rod 53 which in turn will move lever 52 upon its pivotal securing member 64 and disengage lever 52 from catch 59. Immediately upon the raising of lever 52 from its groove 51 and from engagement with catch 59, springs 60 will force catch 59 outward and into engagement with tooth 61. As tooth 61 is formed upon the hub of wheel 34 movement will be conveyed from wheel 34 to clutch 48 and from thence through gearing 49 to shaft 26. Catch 59 will remain in engagement with tooth 61 until treadle 16 is released, and immediately upon the releasing of treadle 16 the arc shaped edge of lever 52 will engage the bottom of groove 51 and consequently be in the path of movement of catch 59 so that bevel 57 will engage the walls of slots 58 and retract the catch. This will disengage the wheel 34 from shaft 26 which will immediately stop under the action of friction brake 14 and also under a friction brake 64, which normally presses against the surface of one end of clutch 48.

In connection with the friction brakes 14 and 64 it will be observed that by moving nuts 14' and 64' the tension of the brakes may be varied as occasion should require. It will be observed also that in connection with reducing gearings 49 and 50 the same may be omitted if desired and clutches 47 and 48 secured to shafts 26 and 35 respectively by any desired means as for instance by a key.

Clutch 48 has been described in detail and as clutch 47 is of identical structure except that it is arranged on the opposite side of wheel 34, no additional description will be necessary as it will be understood that the construction and operation of clutch 47 is identical with clutch 48 except as just stated it is arranged for connecting the opposite side of wheel 34 to shaft 35 through the reducing gearing 50.

A lever similar to lever 52 is provided with an operating rod or link 65 which is pivotally connected with treadle 66 that is normally held elevated by a spring 67. Whenever it is desired to expand the formers or anvils 5 and 6 treadle 66 is depressed for a short time, namely until the operating link 52 pivotally connected with the upper end of rod 65 has disengaged catch 59 of clutch 47 for permitting the catch to engage one of the teeth on the hub of wheel 34. Immediately upon the engagement of catch 59 of clutch 47 with wheel 34 shaft 35 will begin to rotate and immediately upon the starting of the rotation of shaft 35 lever 66 is released. However catch 59 of clutch 47 will remain in engagement with wheel 34 until wheel 34 has made a complete revolution after which the latch will engage its lever for being retracted. One complete revolution of wheel 34 is designed to rotate shaft 35 for only a one half revolution which will cause wrist pin 37 to move from its lower position as shown in Fig. 10 to a raised position as shown in Fig. 1. The movement of wrist pin 37 from the lowered position to the raised position will convey power from shaft 35 for pulling the same and reciprocating bearing or spider 46 toward standard 1. This will cause levers 8 to move bars or links 7 longitudinally and movement will be conveyed therefrom to toggles 10 and 11 for moving outward the sliding segments 12 and 13. After the formers or anvils 5 and 6 have been expanded and it is desired to contract the same treadle 66 is pressed for a moment, that is until catch 59 of clutch 47 has been released.

Movement will then be conveyed from wheel 34 to shaft 35 and from thence to wrist pin 37 for moving the same a one half revolution or to the position shown in Fig. 10. This will convey motion to shaft 45 and force the same, together with spider or bearing 46 outward from standard 1. As links 8 are connected with the bearing or spider 46 the same will be pulled outward and also the rods or links 47 will be moved outward. As toggles 10 and 11 are pivotally connected with bars or levers 7 the same are moved for causing the expanding segments 12 and 13 to move inward to the positions shown in Figs. 3 and 10. By the arrangement of treadles 16 and 66 whenever either of the same is depressed the mechanism connected therewith will begin to operate and will operate until the treadle is released. Treadle 16 is held depressed until the anvils 5 and 6 have made a complete revolution but lever 66 is only held depressed for a moment until catch 59 of clutch 47 is released.

In forming an expansible barrel a veneer tube which may be formed in any desired manner is placed upon the former with one end against flange 71. This will cause the expanding members to come substantially centrally of the barrel for expanding the barrel centrally without disturbing the size of the ends. The guide 68 as more clearly shown in Fig. 3 is secured to shaft 3 by a set screw so as to prevent any movement thereof and is beveled at 70 for permitting the easy positioning of the veneer tube upon the formers. After the end of the tube has passed over guide 68 the same passes over anvils 5 and 6 which are at this time contracted and engages the guide 69 and is stopped from further movement by the flange 71 formed thereon. The flange 71 is arranged to be the proper distance from guide 68 and from anvils 5 and 6 so as to cause one end of the veneer tube to rest upon guide 68 and the other end upon guide 69 and against flange 71. In this position the anvils 5 and 6 may be expanded as heretofore set forth, and when so expanded will expand the veneer tube centrally and form a barrel thereof. After the expanding of the tube the machine is put into operation for causing the stapling mechanisms 23 and 24 to secure to the expanded tube hoops on the outside and inside of the barrel between the ends thereof. The operation however is simply the placing of one or more strips of material around each former and beneath clamp 72 which will hold the same in place until the stapling machine has secured the strips to the interior of the barrel. In supplying hoops to the exterior of the barrel strips of material of the proper length are placed in guides 73 and 74, manually sufficiently far for the first staple to pass through the same, through the barrel, the inner hoop and be clenched on the anvil. Immediately upon the insertion of the first staple and the upward movement of the stapling mechanism preparatory to inserting a second staple the formers 5 and 6 are rotated one step as heretofore set forth which rotation will feed the strips of material into guides 73 and 74 so as to permit the second staple to be forced through the strip of material, the barrel, the inner strip of material forming the inner hoop and against the anvil at a short distance from the end of the outer hoop. Immediately upon the upward movement of the stapling mechanism after the second staple has been inserted the anvils 5 and 6 are stepped forward another step ready for the third staple. This operation is continued until the outside strip has been stapled to the interior of the barrel, and as the same is preferably arranged to overlap a short distance a substantial hoop is provided and secured in place at the same time. By this arrangement it will be observed that simply loose strips are placed upon the expanding anvils or formers 5 and 6 and in guides 73 and 74, and as the stapling mechanism operates and the formers rotate the strips are secured to the barrel and together, and after the same have been secured entirely around the barrel a complete substantial hoop is presented.

In securing the outer hoops in position if it is desired a binding wire may be included with the hoop and held in place by the same staple. When this binding wire is used the same is passed between tension rollers 74' and 75 and 76 and 77 and as the staples pass through the outside hoops the same straddle the wires and consequently clamp the wires against the outer surface of the outer hoop when clenched. After the barrel has been completed the wires are cut by depressing levers 78 and 79 respectively.

What I claim is:

1. In a barrel forming machine, a rotating former, including means for expanding the barrel form centrally without substantially disturbing the size of the ends, and means for positioning hoops upon the barrel interiorly, means for positioning hoops on the barrel exteriorly and in the same plane as said interior hoops, and means for simultaneously forcing securing means through all of said hoops.

2. In a barrel making machine, means for expanding a veneer tube centrally without substantially disturbing the ends thereof, means for positioning hoops on said tube intermediate the ends thereof, and means for forcing securing means into the hoops.

3. The combination with a rotatable form having between its ends a portion transversely expansible independently of the end portions, of coördinately expansible interior hoop positioning means, and exterior hoop positioning means located in the plane of the interior hoop positioning means.

4. In a barrel making machine, a barrel former adapted to receive a barrel blank, means for expanding said barrel former centrally, means for holding hoops on the exterior of said barrel former and interiorly of the barrel blank, means for positioning hoops exteriorly on a barrel blank positioned on said barrel former, and means for forcing securing means through the interior and exterior hoops at one operation.

5. The combination with a rotatable form having between its ends a portion transversely expansible independently of the end portions, of coördinately expansible interior hoop positioning means, exterior hoop positioning means located in the plane of the interior hoop positioning means, and means for applying fasteners for securing the interior and exterior hoops together.

6. In a barrel making machine, rotatable means for supporting the ends of the barrel blank, rotatable expanding mechanism arranged wholly between said end supports and connected therewith for rotating at the same time and speed, means for operating said expanding mechanism for expanding said barrel blank centrally when the ends thereof are resting on said end supports, means for rotating said end supports and said expanding mechanism step by step, and a stapling mechanism associated with said last mentioned means arranged to operate for securing hoops on said blank when said end supports are stationary.

7. In a machine for making barrels of the type having an expanded center, a mandrel formed with nonexpanding ends and expanding central devices, means for expanding said central devices, including links pivotally connected therewith, and a reciprocating member connected with said links, means for operating said reciprocating member, means for rotating said mandrel, and stapling means for securing hoops upon a barrel blank mounted on said mandrel, said last mentioned means operating after said expanding devices have been moved to an expanded position.

8. In a machine for making barrels of the type having an expanded center, an expanding mandrel comprising nonexpanding means for supporting the ends of a barrel blank, means arranged between the ends of said barrel blank for expanding the blank centrally, a ratchet wheel connected to said mandrel for rotating the same, a pawl adapted to engage the ratchet wheel for operating the same, means adapted to move said pawl, means connected with said pawl for causing the pawl to give the ratchet wheel a step by step movement, means for positioning hoops intermediate the ends of said barrel blank, and stapling means associated with said means for moving said pawl in such a manner as to operate while said mandrel is stationary and the barrel blank is in an expanded condition for forming a barrel having an expanded center.

9. In a machine for making barrels of the type having an expanded center, a mandrel for receiving a barrel form comprising a rotatably mounted supporting shaft, end rests secured to said shaft for supporting the ends of said barrel form, expanding means arranged between said end rests for expanding centrally the barrel form placed on said end rests, toggles connected at one end to said expanding mechanism, and at the other to said shaft, means for operating said toggles for causing the same to expand and contract said expanding mechanism for expanding a barrel form placed on said mandrel, and means for securing hoops to the barrel form after the same has been expanded for holding the same in an expanded position.

10. In a machine for making barrels of the type having a bulged center, the combination with a rotatable mandrel constructed with radially movable members between its ends, and toggle means connected therewith for moving said members, of hoop positioning means arranged to position hoops on a barrel blank after the same has been expanded by said movable members, and a stapling mechanism for applying fasteners to the hoops while the barrel blank is in an expanded condition.

11. In a barrel making machine, the combination with hoop stapling mechanism, of means for expanding a barrel blank centrally, means for positioning hoop strips interiorly of said barrel blank, means for positioning strips of hoop material exteriorly of said barrel blank in the same plane as said interior hoop strips, means for rotating said expanding means, and means for operating said stapling mechanism, associated with said last mentioned means, for causing said stapling mechanism to force fasteners through said hoops and said barrel blank while the barrel blank is in an expanded condition.

12. In a barrel making machine, the combination with a stapling mechanism, of rotatable end rests for supporting the ends of barrel forms, a rotatable mandrel for expanding barrel forms centrally, said mandrel being formed with a plurality of radially movable anvil segments, a shaft for supporting said segments, an independent toggle for each of said segments arranged to operate exteriorly of said shaft, and means for operating said toggles for expanding and contracting said mandrel, spring pressed clamps for positioning strips of material interiorly of said barrel forms, means for positioning strips of material exteriorly of said barrel forms when said barrel forms are in an expanded condition, and means for rotating said mandrel and operating said stapling mechanism at the same time for forcing securing means through said strips of material and said barrel forms for forming hoops therefor secured thereto.

13. In a barrel making machine, the combination with a rotatable form comprising end rests for receiving and supporting the ends of a barrel tube, one of said end rests being formed with a stop for regulating the position of said tube, radial expansible mechanism arranged substantially centrally of the form between the ends of said rests, and means for expanding said expansible members, of means for rotating said form, coördinately expansible interior hoop positioning means, and exterior hoop positioning means located in the same plane, and means for applying fasteners for securing the interior and exterior hoops together.

14. In a barrel making machine, the combination with a stapling mechanism, of an expansible mandrel for bulging centrally a barrel form, said mandrel being formed with a plurality of radially movable segments, and means for moving said segments, a spring pressed clamp normally engaging the exterior of said mandrel for holding circular hoop strips thereon, means for positioning hoop strips on the exterior of said barrel form and in the same plane as the hoops held by said spring pressed clamp, and means for rotating said mandrel step by step and operating said stapling mechanism for causing said stapling mechanism to force securing means through said hoop strips and said barrel form.

15. In a machine for making barrels of the type having an expanded center, a mandrel for receiving a tubular blank, means for supporting the ends of said blank, a plurality of expanding means arranged intermediate the ends of said mandrel for expanding the blank placed on said ends, a ratchet wheel rigidly secured to said mandrel for rotating the same step by step, a pawl arranged to engage said ratchet wheel and move the same, reciprocating means for moving said ratchet wheel, and stapling mechanism associated with said reciprocating means for securing hoops on said blank, said stapling means being operated in such relation to said reciprocating means as to force fasteners into said blank while said mandrel is stationary.

16. In a machine for making barrels of the type having an expanded center, an expansible mandrel, means for supporting the ends of a barrel blank, means arranged between the ends of said barrel blank for expanding the same centrally, means for positioning hoops intermediate the ends of the blank, and mechanically operated nailing or stapling means located in position with respect to the mandrel for forcing securing means through the hoops and the blank for securing the same together.

In testimony whereof I affix my signature in presence of two witnesses.

JOHN F. EAST.

Witnesses:
ERNEST THORP,
A. B. CAREY.

---

Copies of this patent may be obtained for five cents each, by addressing the "Commissioner of Patents, Washington, D. C."